US009136724B2

United States Patent
Ye et al.

(10) Patent No.: US 9,136,724 B2
(45) Date of Patent: Sep. 15, 2015

(54) METHOD FOR LIMITING BATTERY DISCHARGING CURRENT IN BATTERY CHARGER AND DISCHARGER CIRCUIT

(75) Inventors: Mao Ye, Plano, TX (US); Jinrong Qian, Plano, TX (US); Suheng Chen, Knoxville, TN (US); Richard Stair, Knoxville, TN (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 791 days.

(21) Appl. No.: 13/107,086

(22) Filed: May 13, 2011

(65) Prior Publication Data

US 2012/0139500 A1 Jun. 7, 2012

Related U.S. Application Data

(60) Provisional application No. 61/418,616, filed on Dec. 1, 2010, provisional application No. 61/479,284, filed on Apr. 26, 2011.

(51) Int. Cl.
| | |
|---|---|
| *H02J 7/00* | (2006.01) |
| *H02M 1/10* | (2006.01) |
| *H02M 3/158* | (2006.01) |
| *H02M 1/32* | (2007.01) |

(52) U.S. Cl.
CPC ............ *H02J 7/0068* (2013.01); *H02M 1/10* (2013.01); *H02M 3/1582* (2013.01); *H02J 2007/0059* (2013.01); *H02M 1/32* (2013.01); *Y02T 90/127* (2013.01); *Y10T 307/625* (2015.04)

(58) Field of Classification Search
USPC .................................................. 320/135, 136
See application file for complete search history.

(56) References Cited

U.S. PATENT DOCUMENTS

| | | | |
|---|---|---|---|
| 6,502,044 B1 * | 12/2002 | Lane et al. .................. 702/63 |
| 6,917,188 B2 * | 7/2005 | Kernahan ................... 323/282 |
| 2004/0095118 A1 * | 5/2004 | Kernahan ................... 323/282 |

(Continued)

FOREIGN PATENT DOCUMENTS

| | | |
|---|---|---|
| CN | 1838503 A | 9/2006 |
| CN | 101252287 A | 8/2008 |

OTHER PUBLICATIONS

Keates, Hybrid Power Drive for Mobile Computing, Intel Corporation, Mar. 2011.

(Continued)

*Primary Examiner* — Yalkew Fantu
(74) *Attorney, Agent, or Firm* — William B. Kempler; Frank D. Cimino

(57) ABSTRACT

A power supply system includes a rechargeable battery to deliver a supply current to a load and a circuit to limit a discharge current when the rechargeable battery is supplying power to the load. The power supply system may further include an integrator for integrating a discharge voltage representing the discharge current that exceeds a predetermined limit, a pulse-width-modulation (PWM) circuit for producing a control signal having a PWM duty cycle representing the discharge voltage, and a driver circuit for delivering the supply current to said load according to said control signal. In one embodiment, a digital register is used to set the battery discharging current limit, in another embodiment an analog circuit is used to set the battery discharging current limit, and in yet another embodiment or a combination of the digital register and analog circuit is used to set the battery discharging current limit.

19 Claims, 5 Drawing Sheets

(56) References Cited

U.S. PATENT DOCUMENTS

| | | |
|---|---|---|
| 2006/0187689 A1 | 8/2006 | Hartular |
| 2007/0194759 A1* | 8/2007 | Shimizu et al. ............... 320/166 |
| 2007/0285048 A1* | 12/2007 | Leach et al. .................. 320/101 |
| 2008/0150488 A1 | 6/2008 | Lu et al. |
| 2008/0169705 A1* | 7/2008 | Tan et al. ......................... 307/66 |
| 2011/0006728 A1 | 1/2011 | Kung et al. |
| 2012/0139345 A1 | 6/2012 | Ye et al. |

OTHER PUBLICATIONS

English Translation of Chinese Office Action for Chinese Patent Application No. 201180058198.3, mailed Mar. 13, 2015.
Chinese Search Report, mailed Mar. 13, 2015.
CN101252287A, English Machine Translation.
CN1838503A, English Machine Translation.

* cited by examiner

METHOD FOR LIMITING BATTERY DISCHARGING CURRENT IN BATTERY CHARGER AND DISCHARGER CIRCUIT

CROSS-REFERENCES TO RELATED APPLICATIONS

This application claims the benefit of U.S. Provisional Patent Application Ser. No. 61/418,616, filed Dec. 1, 2010, and also claims the benefit of U.S. Provisional Patent Application Ser. No. 61/479,284, filed Apr. 26, 2011, both of which are assigned to the assignee hereof and incorporated herein by reference in their entireties.

FIELD

The various embodiments described herein relate in general to hybrid power supply circuits, and the like, and methods for controlling same, and more specifically to methods and circuits for controlling the current drawn from a battery associated with the hybrid power supply circuit in a mode in which supply current is needed in excess of that which can be supplied by a power supply adapter.

BACKGROUND

Rechargeable batteries, typically lithium-ion batteries, are widely used in consumer electronic devices, especially portable computers and mobile devices. Although examples of devices with which such batteries may be used are manifold, some recent examples include smartphone, notebook, tablet, and netbook computing devices, or the like, which have a CPU and memory that require operating power. When the device is not powered by the battery, an adapter is commonly used to power the device with which the battery is associated. At the same time, the adapter provides power to a charging circuit in the device to charge the battery. In such charging circuits, a synchronous switching buck converter is often used to control the charging current to the battery, while providing a substantially constant voltage to the load.

Traditionally, when the power required by the CPU and system load increase to reach the adapter power limit, the charge current can be reduced to zero, thereby giving a higher priority to power the system than to charge the battery. However, in certain conditions, if the CPU power demands are greater than those that can be met by the adapter, the adapter may crash. An example of such condition is when the system is cold and the CPU power needed for application processing and speeding up data flow is much more than the power that the adapter can supply, even with zero charging current.

In the past, several solutions to the problem have been advanced. For example, one solution disables the CPU high current mode. This, however, lowers the system performance. Another solution uses an adapter with an increased current capability. This, however, increase the adapter cost. Yet another solution reduces the system bus voltage. This, however, is not a widely adopted battery charger solution, and is not suitable for a high power system. Still another solution is to add an additional boost converter and include a boost controller. This, however, requires at least a power MOSFET, diode, and other circuit components. The cost of this solution is high and needs more space.

Thus, in order to solve the problem of operating a CPU at a high speed to improve the system performance, while not crashing the adapter, it has been suggested to use the battery and adapter to simultaneously power the system when power demands are high. One way in which this has been done has been to use a boost converter in the charging circuit to convert the battery power for delivery to the system. The charger can operate in a synchronous buck mode during the battery charging and in a boost mode when additional power to CPU and system is needed. This type of charging circuit is referred to herein as a "hybrid power battery charger."

Because the adapter current is well controlled by the hybrid power battery charger, the battery discharging current changes when total system current changes. However, for any particular portable device, numerous battery pack options may be available. For example, numerous interchangeable battery pack designs may be used. For example, 3S1P (3 cells in series 1 cell in parallel), 3S2P, 3S3P, and so on can be used to power the same device. However, different battery packs have different discharging current capabilities. Thus, for the same device, different power delivery capabilities may be available, depending on the particular battery pack design that is selected or installed.

Each battery pack generally has an over-current protection circuit to protect the battery in the event the load attempts to draw current above a maximum current level that is established for the battery. For example, usually, the over-current protection circuits turn off a built-in MOSFET device in series with the battery output, if the current drawn from the battery is over the maximum current level. In normal operation, it is preferred that this kind of protection should never be triggered.

What is needed, therefore, is a system and method of the type that uses the battery charger in a boost mode to boost the current available from the battery to supplement the adapter current when needed, and that controls the discharge rate of the battery when it is connected in this mode.

SUMMARY

This various embodiments described herein use a digital register to set the battery discharging current limit, an analog circuit to set the battery discharging current limit, or a combination of the two previous mentioned methods to set the battery discharging current limit. A current sensing resistor and differential amplifier sensing the discharging current along with the closed current control loop regulate the discharging current to a level no more than the discharging current limit set by either from digital register or analog circuit.

Thus, in accordance with one embodiment disclosed herein, a power supply system is described which includes a rechargeable battery connectable to deliver a supply current to a load and a circuit to limit a discharge current when the rechargeable battery is supplying power to the load. The power supply system may further include an integrator for integrating a discharge voltage representing the discharge current that exceeds a predetermined limit, a pulse-width-modulation (PWM) circuit for producing a control signal having a PWM duty cycle representing the discharge voltage, and a driver circuit for delivering the supply current to said load according to said control signal.

According to a method embodiment a method for operating a power supply system is described in which a rechargeable battery is provided that is connectable to deliver a supply current to a load, and a circuit is provided to limit a discharge current from the rechargeable battery when the rechargeable battery is supplying power to the load. The method also includes switching from a buck mode of operation to a boost mode of operation in which the rechargeable battery supplies additional supply current to the load. When the discharge current exceeds a predetermined limit, a control signal is generated having a duty cycle corresponding to an amount by which the discharge current exceeds the predetermined limit, and the control signal is used to control the supply current to limit the discharge current.

BRIEF DESCRIPTION OF THE DRAWINGS

FIG. 4 is an electrical schematic diagram of one embodiment of a programmable circuit for regulating the discharge current of a rechargeable battery pack, using a digital register to enable the discharging current limit to be set by a host, such as a smartphone, notebook, tablet, netbook computing device, or the like.

In the various figures of the drawing, like reference numbers are used to denote like or similar parts.

DETAILED DESCRIPTION

Figure 1:
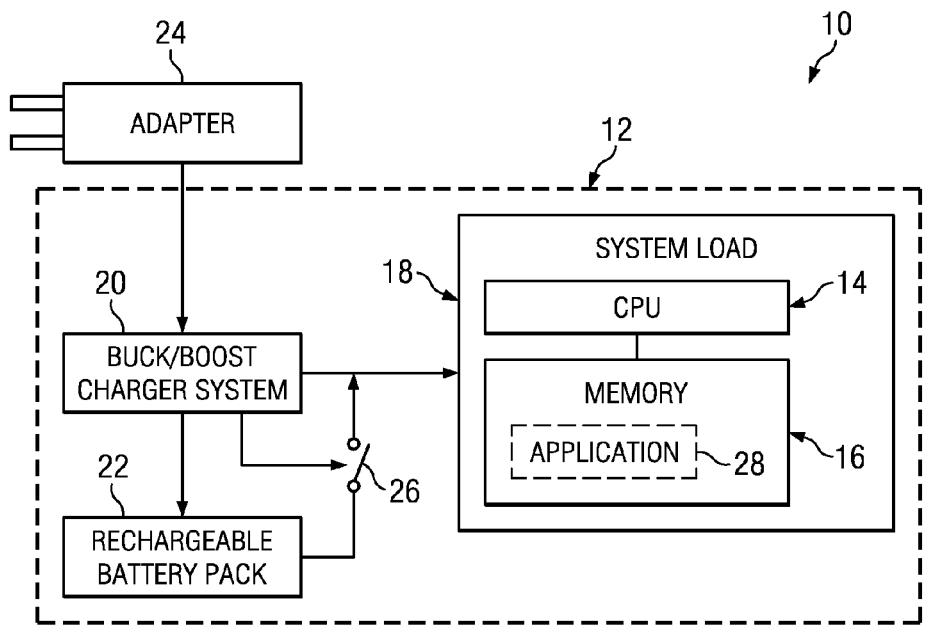
FIG. 1 is a block diagram of an example of a hybrid battery charger environment in which battery charging and controlling circuits and methods described herein may be employed.

A block diagram of an example of a hybrid battery charger environment 10 is shown in FIG. 1. The hybrid battery charger environment 10 includes a system 12, which may be, for instance, a smartphone, notebook, tablet, netbook computing devices, or the like, which has a CPU 14 and a memory 16 that require operating power. The CPU 14 and memory 16 are part of the system load 18 for which the operating power is needed. The operating power to the system load is provided by a buck/boost charger system 20 and an associated rechargeable battery pack 22, in a manner described below in greater detail. The rechargeable battery pack 22 may be a lithium-ion battery pack, for example, although other rechargeable battery types may also be employed.

An adapter 24 is provided, which is optionally connectable to receive ac power, typically from an ac outlet, not shown, to convert the ac power to dc power to supply power to the buck/boost charger system 20 to power the system load 18, and to charge an associated rechargeable battery pack 22. For example, depending on the particular power requirements of a particular system load 18, a typical adapter may supply 90 W of power at about 20 V, thereby having the capability of supplying about 4.5 A current. The adapters, of course are load dependent, and may vary greatly from one application to another; however, one of the advantages of the hybrid battery charger of the type described herein is that the power requirements of the particular adapter needed can be reduced from that which would be required if the adapter alone is used to supply operating power to the system load 18. The adapter 24 may be supplied as a component that is external to the device or system that it is intended to supply power, and is selectively connectable thereto.

A switch 26 connects the battery pack 22 to the system load 18 when the adapter 24 is not connected to receive ac power so that system load 18 is powered by the rechargeable battery pack 22 directly. When the adapter 24 is connected to receive ac power, switch 26 is opened to disconnect the rechargeable battery pack 22 from system load 18 so that system load 18 is powered by the ac adapter directly. According to the embodiments described below, the rechargeable battery pack 22 can supply additional power to the system load 18 when the capabilities of the adapter 24 are exceeded. More specifically, when the power required by the system load 18 is more than the adapter 24 can provide, the buck/boost charger system 20 may call upon the rechargeable battery pack 22 to provide the additional power, for example by switching the rechargeable battery pack 22 into the system by, for instance, changing the buck converter charger to a boost converter. In addition, when the power required by the system load 18 is higher than that which can be provided by the adapter 24, the battery charge current is not only reduced to zero, but the buck/boost charger system 20 is operated in a boost mode so that the adapter and battery power the system simultaneously.

In one embodiment, if the power demanded by the system load 18 reaches an overload condition of the adapter 24 at or exceeding the maximum power limit of the adapter, the buck/boost charger system 20 changes from buck mode to boost mode and allows the rechargeable battery pack 22 to provide additional power to the system load 18. As a result, the adapter 24 and the rechargeable battery pack 22 together provide sufficient system power, thereby avoiding an adapter crash and enabling the system load 18, including its CPU 14, to receive maximum available power for achieving its highest performance.

Figure 2:
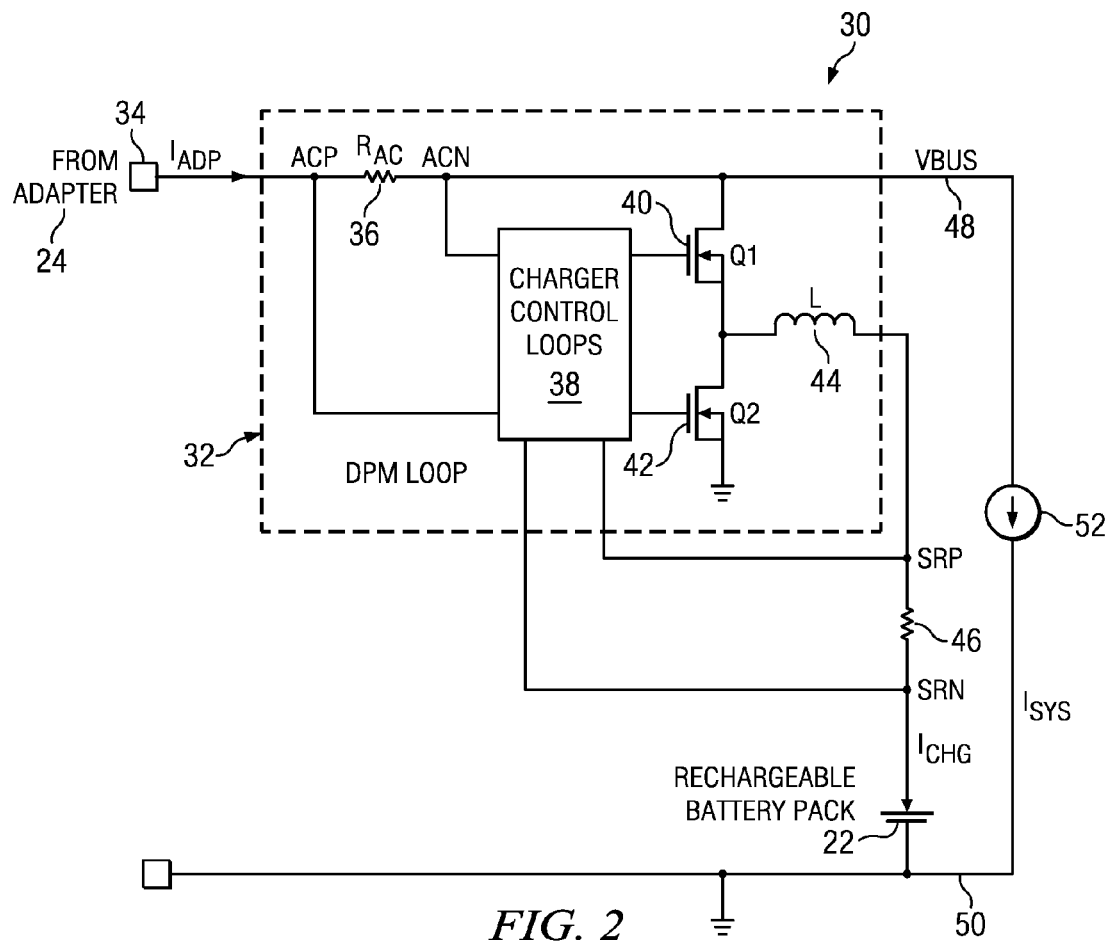
FIG. 2 is an electrical schematic diagram illustrating an example of an embodiment of a charger circuit having a voltage boost function that may be used in the battery charging and controlling circuits and methods described herein.

With reference now additionally to FIG. 2, an electrical schematic diagram is shown, illustrating an example of an embodiment of a charger circuit 30 having a voltage boost function that may be used to provide the battery charging and controlling circuits and methods described herein. The charger circuit 30 has a dynamic power management (DPM) circuit 32 that receives input power on input node 34 from an adapter 24 of the type described above which can be selectively connected thereto.

The DPM loop 32 includes an input current sensing resistor 36, the nodes on either side of which being designated "ACP" and "ACN," which are connected as inputs to the charger control loops 38, described below in greater detail. A pair of MOSFET devices 40 and 42 are connected to receive respective high-side and low-side driving voltages from the charger control loops 38, depending on whether the charger is operating in buck or boost modes. An inductor 44 is connected to the rechargeable battery pack 22 by a charge current sensing resistor 46. The respective sides of the charge current sensing resistor 46 are designated "SRP and "SRN," and are connected as inputs to the charger control loops 38, as described in greater detail below. The power output from the charger circuit 30 is represented by the VBUS voltage shown between line 48 and the reference potential, or ground line 50, and by the current source $I_{SYS}$ 52.

Figure 3A:
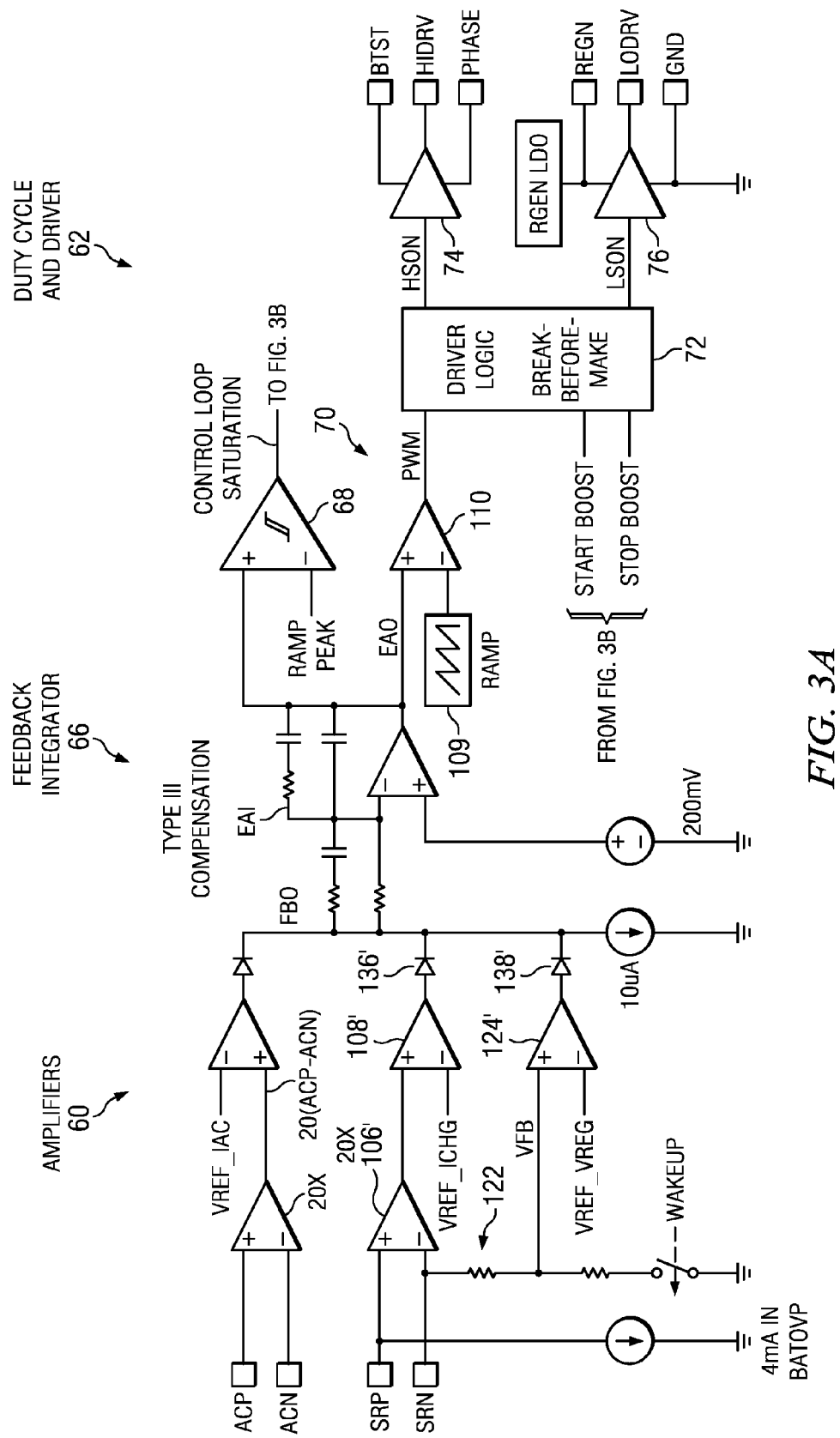
FIG. 3A is a block diagram of an example of feedback amplifier, integrator, duty cycle, and driver circuits for implementing the battery charging and controlling circuits and methods of FIG. 2.
Figure 3B:
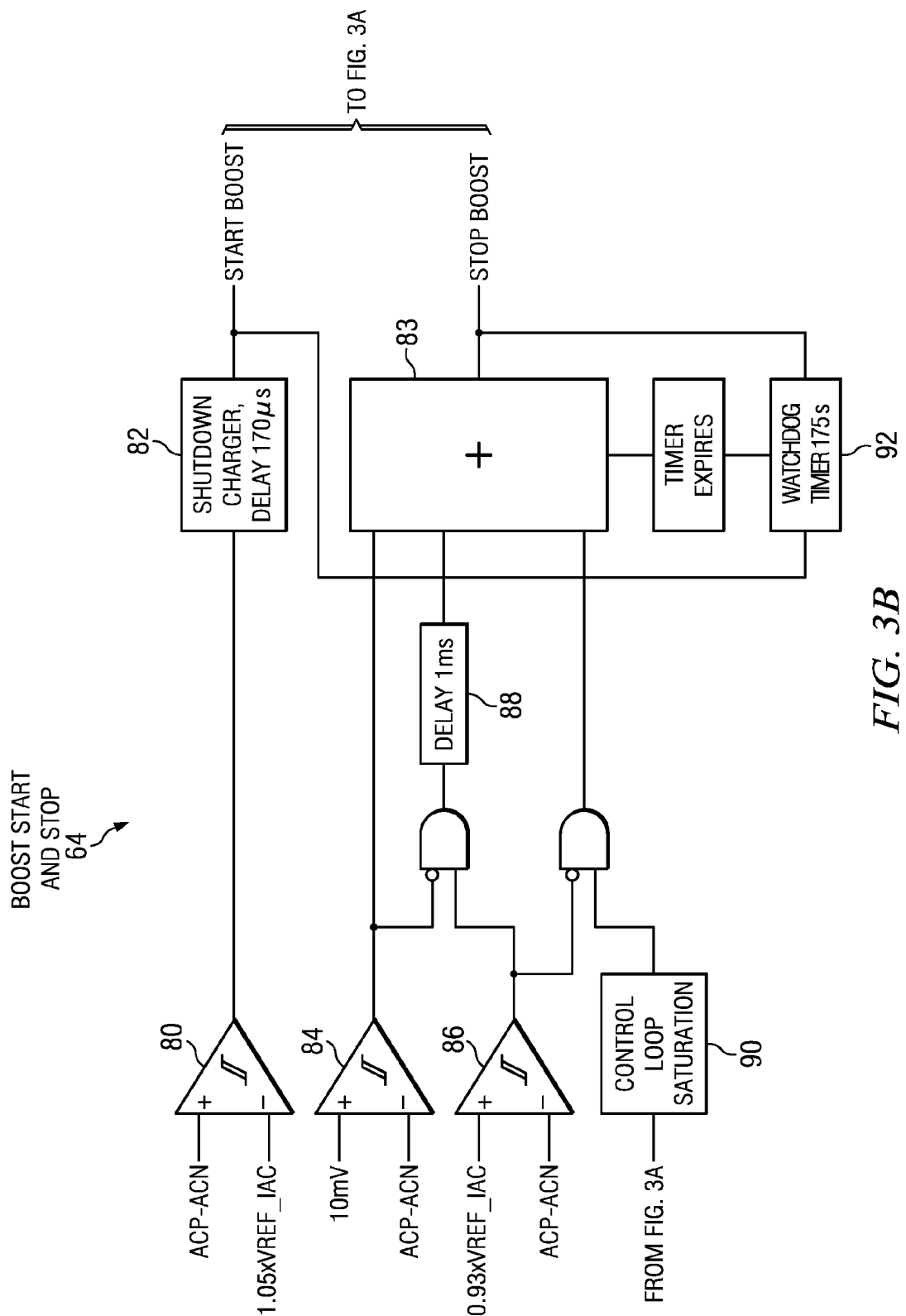
FIG. 3B is a block diagram of an example of start/stop boost mode control circuits for implementing the battery charging and controlling circuits and methods of FIG. 2.

With reference now additionally to FIG. 3A in which is shown the amplifier 60, feedback integrator 66, duty cycle, and driver circuits 62, and to FIG. 3B in which is shown the boost stop and start circuit 64. The amplifier circuits 60 receives inputs ACP, ACN, SRP, and SRN, respectively, from the input current sensing resistor 36 and charge current sensing resistor 46, providing an input to the type III compensation circuit 66. The output from the compensation circuit 66 is applied to a control loop saturation determining circuit 68 and to a PWM circuit 70. The output from the control loop saturation determining circuit 68 is connected to the boost stop and start circuit 64, described below, and the output from the PWM circuit 70 is connected to the driver logic circuit 72.

The start boost and stop boost signals developed in the boost stop and start circuit 64 are also connected as inputs to the driver logic circuit 72. The outputs HSON and LSON signals are connected to output drivers 74 and 76, which are level adjusted by BTST, PHASE and REGN and GND voltages to provide drive signals to the MOSFET devices 40 and 42 (FIG. 1) at the correct voltage levels.

The boost start and stop circuit 64 is shown in FIG. 3B, to which reference is now additionally made. The boost start and stop circuit 64 receives inputs representing the voltage difference between ACP and ACN. This voltage difference may be developed, for example, in the amplifier circuits 60 of FIG. 3A, with appropriate scaling.

With respect to the start boost mode, the voltage difference between ACP and ACN is compared to a reference voltage, for example 1.05×VREF_IAC by comparator 80. VREF_IAC represents a particular upper current level that is established by the host below which operation of the adapter should be held to avoid crashing the adapter. The comparator 80 has hysteresis so that momentary changes in the ACP-ACN voltage difference do not cause the comparator 80 to revert to its previous state. The reference voltage is established such that if the voltage difference ACP-ACN developed across the input current sensing resistor 36 reaches a predetermined percentage of the power limit of the adapter 24, in this case 105%, the comparator 80 changes output state.

In the particular embodiment illustrated, the output from the comparator 80 is connected to a delay circuit 82 which operates to shut down the charger and begin a predetermined delay, for example 170 μs in response to the change of state in the output of the comparator 80. If the voltage output from the comparator 80 returns to a low value before the predetermined delay, indicating that the boost mode is not required, the boost mode is not initiated and the charger is turned back on. However, after the expiration of the predetermined delay, the start boost output changes state, triggering the driver logic circuit 72 (FIG. 3A) to turn on the low-side MOSFET device 42 (FIG. 2) via the low-side driver 76 and high-side MOSFET device 40 (FIG. 2) via the high-side driver 74.

With respect to the stop boost signal, four possible input signals can trigger the stop boost signal. The four signals are applied to an OR gate 83, the output of which being the stop boost signal that is applied to the driver logic circuit 72 (FIG. 3A). The first input signal is an immediate trigger developed by comparator 84 when the voltage difference ACP-ACN is less than a predetermined voltage, such as 10 mV. When this condition occurs, the boost mode is immediately shut down to prevent ACOV (system bus over voltage). The second input signal is a trigger that occurs when the voltage difference ACP-ACN is a predetermined percentage below the VREF_IAC voltage level. In the example illustrated, the percentage is 93%, and is established by the comparator 86. If the voltage difference ACP-ACN is a predetermined percentage below the VREF_IAC voltage level, and the output from the comparator 84 is not high, a 1 ms delay is timed by a timer 88 to trigger the stop boost output signal.

In addition, if the control loop is in saturation, determined in block 90, and if the voltage difference ACP-ACN is not a predetermined percentage below the VREF_IAC voltage level, the stop boost output signal is triggered. Finally, a watchdog timer 92 is provided to assure that the boost mode does not remain engage for a predetermined time, such as 175 seconds in the example shown.

Figure 4:
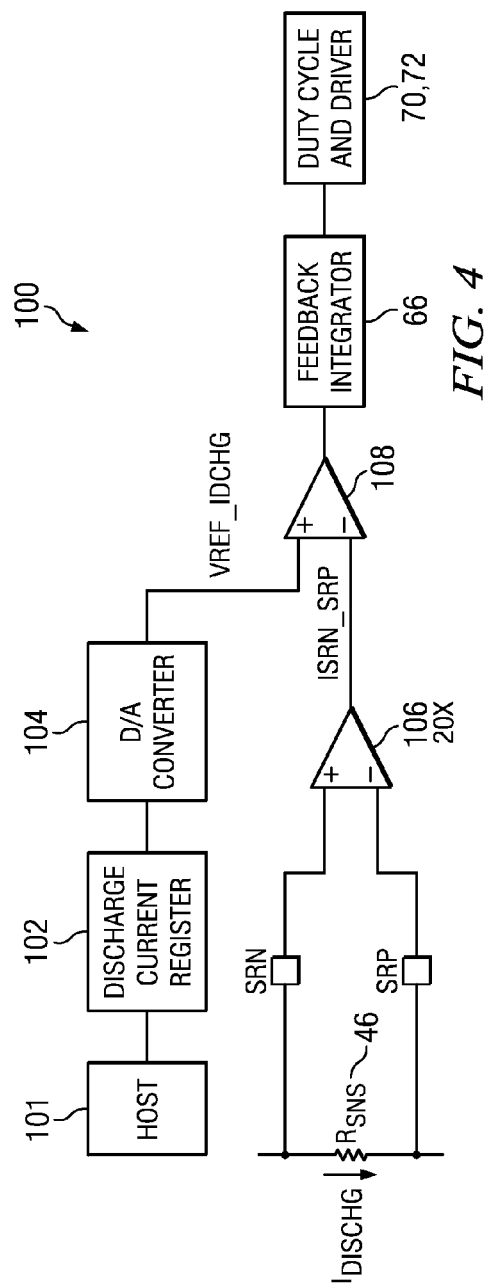

When the charger circuit 30 is in boost mode, the discharge current of the rechargeable battery pack 22 may be regulated by a rechargeable battery pack current regulation circuit. One embodiment of a rechargeable battery pack current regulation circuit 100 that may be employed is shown in FIG. 4, to which reference is now additionally made. The battery pack current regulation circuit 100 of FIG. 4 is programmable through the use of a digital register 102 that enables the discharge current limit to be set by a host 101, such as a smartphone, notebook, tablet, netbook computing device, or the like, via a system management bus, an I2C bus, or the like. The host 101 may include the system load (see FIG. 1), for example, and, in some embodiments, may also carry the rechargeable battery pack 22.

In operation, the battery pack current regulation circuit 100 senses the discharge current from the rechargeable battery pack 22 by monitoring the voltage nodes SRP and SRN on each side of the charging current sensing resistor 46 (see FIG. 2). In FIG. 4, the current in the charging current sensing resistor 46 is labeled "$I_{DISCHG}$," since the discharge current is of interest when the charger circuit 30 is in its boost mode of operation and the rechargeable battery pack 22 is used to supplement the current from the adapter 24 and is therefore discharging current.

The voltage on the nodes SRP and SRN is applied to the inputs of an operational amplifier 106, where it is amplified, for example, 20 times, and applied to the inverting input of an operational amplifier 108. (The operational amplifier 106 and the operational amplifier 108 are also seen in FIG. 3A where they are designated with a prime ('); however, the inverting and noninverting inputs are switched, as discussed below in greater detail.) As mentioned, the discharge current limit set by the host 101 is determined by a host-set digital value established in the discharge current register 102. The digital value is converted to an analog value by a D/A converter 104, which is applied to the noninverting input of the operational amplifier 108.

When the discharge current, $I_{DISCHG}$, creates a voltage across the charging current sensing resistor 46 that is greater than the analog voltage established by the value in the discharge current register 102, the output of the operational amplifier 108 begins to follow the voltage produced by the discharge current, $I_{DISCHG}$. The output voltage is integrated by the feedback integrator 66, the output of which is applied to the noninverting input of a comparator 110 (see FIG. 3A). A ramp voltage 109 is applied to the inverting input of the comparator 110. Thus, the output of the comparator 110 is a pulse-width-modulated (PWMed) voltage, the duty cycle of which is determined by the voltage level of the output of the feedback integrator 66. This, in turn, controls the driver logic circuit 72 which controls the on and off times of the boost MOSFET devices 42 and 40 (see FIG. 2), which limit the amount of current drawn from the rechargeable battery pack 22 according to the digital value loaded into the discharge current register 102.

When the embodiment of the rechargeable battery pack current regulation circuit 100 is instantiated in the amplifier, integrator, duty cycle, and driver circuits of FIG. 3A the same circuitry that is used to limit the charge current may also be utilized to perform the discharge current limiting function, through the use of dynamic switching (not shown) of the inverting and noninverting inputs. The circuit configuration showing operational amplifier 106' and operational amplifier 108' is shown in FIG. 3A as it would appear to support charge-current limiting. To support discharge-current limiting, the inverting and noninverting inputs of the amplifier 106' and operational amplifier 108' are dynamically switched, for example, when the charger circuit 30 enters boost mode, to the configurations shown in FIG. 4.

Figure 5:
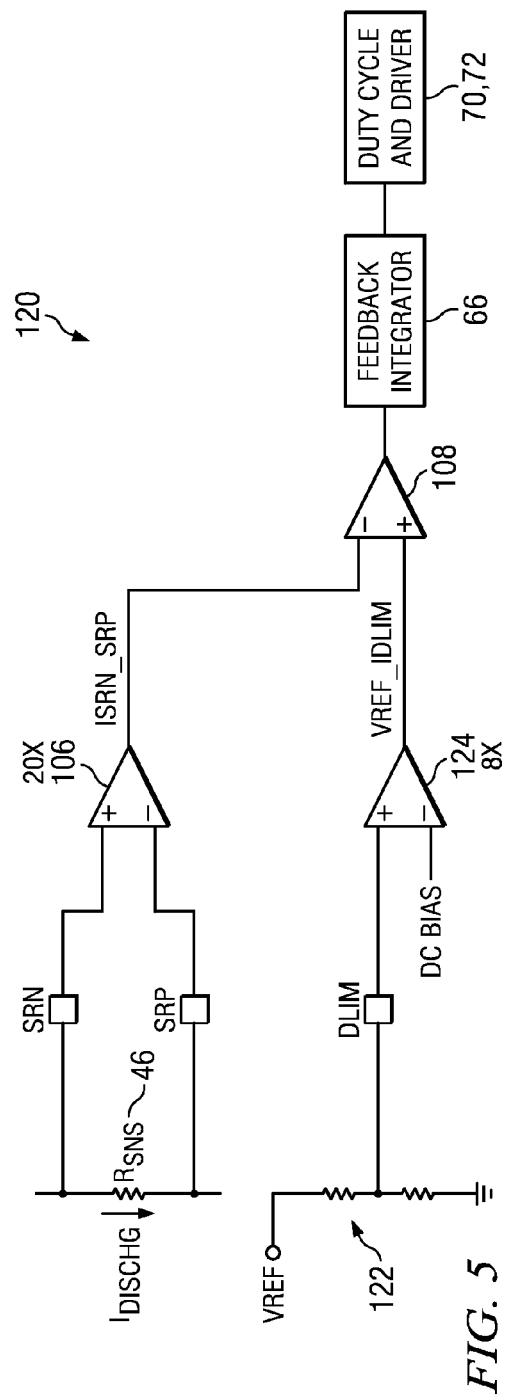
FIG. 5 is an electrical schematic diagram of another embodiment of a programmable circuit for regulating the discharge current of a rechargeable battery pack, using a hardware pin voltage that may be set by a user.

Another embodiment of a rechargeable battery pack current regulation circuit 120 that may be employed is shown in FIG. 5, to which reference is now additionally made. The battery pack current regulation circuit 120 of FIG. 5 can be programmed by an analog voltage that is used to set the discharging current limit. In one embodiment, the analog voltage can be established by a reference voltage and a two-resistor divider 122 and in another embodiment from a current source and one resistor (not shown). The analog voltage can be processed by an internal circuit to produce a desired DC bias voltage that to produce the discharging current limit reference voltage. The analog voltage may be set, for example, by a user upon the installation of the rechargeable battery pack 22 having known device characteristics, including the maximum discharge current.

In operation, the battery pack current regulation circuit 120 senses the discharge current from the rechargeable battery pack 22 by monitoring the voltage nodes SRP and SRN on each side of the charging current sensing resistor 46 (see FIG. 2). As before, in FIG. 5, the current in the charging current sensing resistor 46 is labeled "$I_{DISCHG}$," since the discharge current is of interest when the charger circuit 30 is in its boost mode of operation and the rechargeable battery pack 22 is used to supplement the current from the adapter 24 and is therefore discharging current.

The voltage on the nodes SRP and SRN is applied to the inputs of an operational amplifier 106, where it is amplified, for example, 20 times, and applied to the inverting input of an operational amplifier 108. (The operational amplifier 106 and the operational amplifier 108 are also seen in FIG. 3A where they are designated with a prime ('); however, the inverting and noninverting inputs are switched, as discussed below in greater detail.) As mentioned, the discharge current limit is set by a reference voltage, a voltage divider 122 being shown for illustration in FIG. 5. The reference voltage may be amplified, for example eight times in the embodiment illustrated, by an operational amplifier 124 and applied to the non-inverting input of the operational amplifier 108.

When the discharge current, $I_{DISCHG}$, creates a voltage across the charging current sensing resistor 46 that is greater than the analog voltage established by the reference voltage at the output of the operational amplifier 124, the output of the operational amplifier 108 begins to follow the voltage produced by the discharge current, $I_{DISCHG}$. The output voltage is integrated by the feedback integrator 66, the output of which is applied to the noninverting input of an operational amplifier 110 (FIG. 3A). A ramp voltage 109 is applied to the inverting input of the comparator 110. Thus, the output of the operational amplifier 110 is a pulse-width-modulated (PWMed) voltage, the duty cycle of which is determined by the voltage level of the output of the feedback integrator 66. This, in turn, controls the driver logic circuit 72 which controls the on and off times of the boost MOSFET devices 42 and 40 (see FIG. 2), which limit the amount of current drawn from the rechargeable battery pack 22, according to the preset reference voltage.

When the embodiment of the rechargeable battery pack current regulation circuit 120 is instantiated in the amplifier, integrator, duty cycle, and driver circuits of FIG. 3A the same circuitry that is used to limit the charge current may also be utilized to perform the discharge current limiting function, through the use of dynamic switching (not shown) of the inverting and noninverting inputs. The circuit configuration showing operational amplifier 106' and operational amplifier 108' is shown in FIG. 3A as it would appear to support charge-current limiting. To support discharge-current limiting, the inverting and noninverting inputs of the operational amplifier 106' and operational amplifier 108' are dynamically switched, for example, when the charger circuit 30 enters boost mode, to the configurations shown in FIG. 5.

Figure 6:
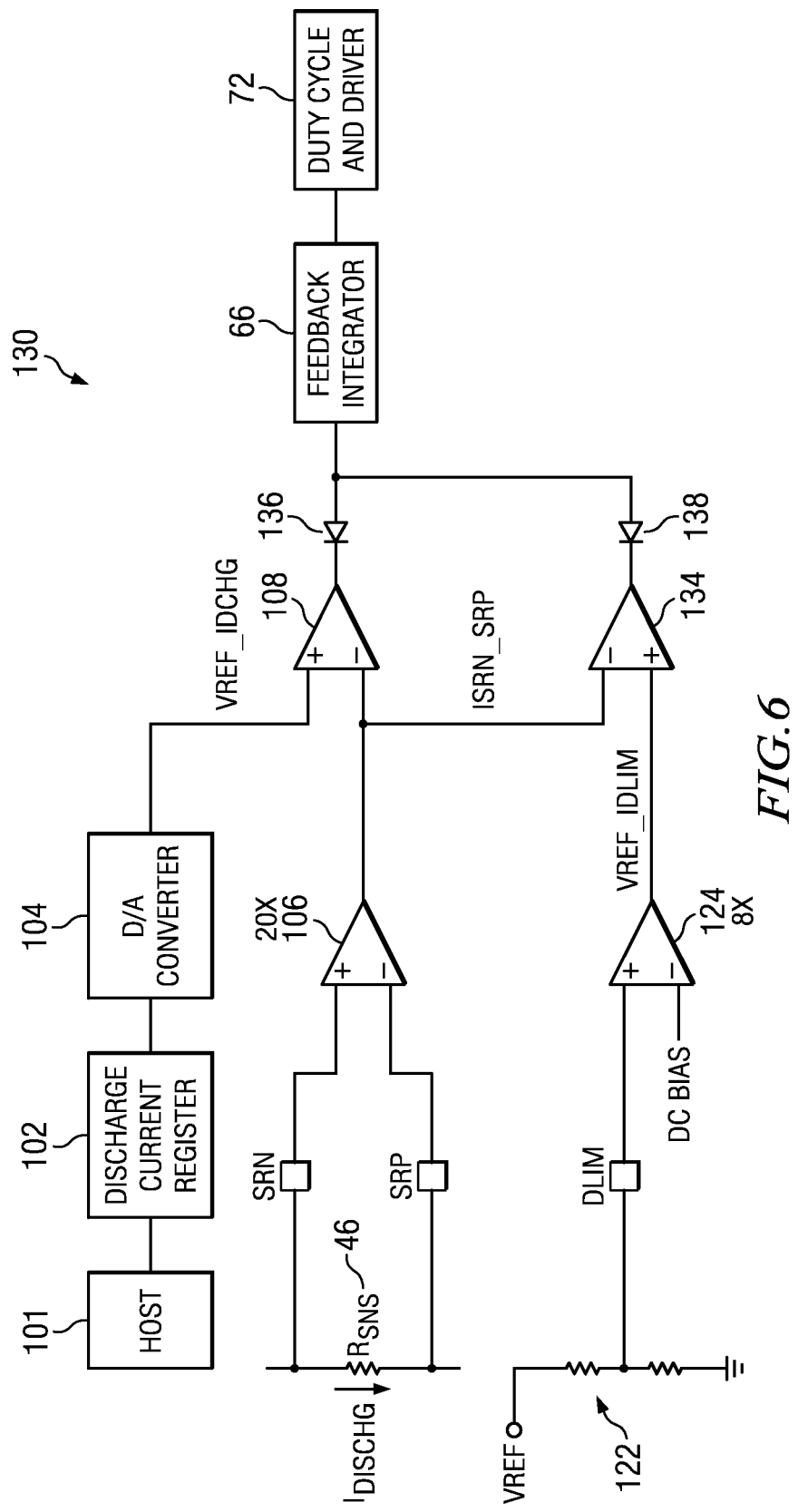
FIG. 6 is an electrical schematic diagram of yet another embodiment of a programmable circuit for regulating the discharge current of a rechargeable battery pack, using both a digital register and a hardware pin voltage to enable the discharging current limit to be set by a host or by a user.

The digital register embodiment of FIG. 4 and the analog reference voltage embodiment of FIG. 5 can be used together, wherein the battery discharge current limit is the lower of these two current limits. An embodiment of a battery pack current regulation circuit 130 employing a digital register and analog reference voltage to establish the discharge current limit of the rechargeable battery pack 22 is shown in FIG. 6, to which reference is now additionally made. As with the embodiment shown in FIG. 4 above, the battery pack current regulation circuit 130 of FIG. 6 is programmable through the use of a digital register 102 that enables the discharging current limit to be set by a host 101, such as a smartphone, notebook, tablet, netbook computing device, or the like, via a system management bus, an I2C bus, or the like.

The battery pack current regulation circuit 130 of FIG. 6 is also programmable through the use of an analog voltage, for example, derived from a voltage divider 122, or other voltage source (not shown) in the manner described in FIG. 5 above. The battery pack current regulation circuit 130 senses the discharge current from the rechargeable battery pack 22 by monitoring the voltage nodes SRP and SRN on each side of the charging current sensing resistor 46 (see FIG. 2). In FIG. 6, the current in the charging current sensing resistor 46 is labeled "$I_{DISCHG}$," since the discharge current is of interest when the charger circuit 30 is in its boost mode of operation and the rechargeable battery pack 22 is used to supplement the current from the adapter 24 and is therefore discharging current.

The voltage on the nodes SRP and SRN is applied to the inputs of an operational amplifier 106, where it is amplified, for example, 20 times, and applied to the inverting input of an operational amplifier 108. The discharge current limit set by the host 101 is determined by a host-set digital value established in the discharge current register 102. The digital value is converted to an analog value by a D/A converter 104, which is applied to the inverting input of the operational amplifier 108.

The output of the operational amplifier 106 is also applied to the inverting input of an operational amplifier 134, which receives the output voltage from the amplifier 124 on its noninverting input. The outputs from the operational amplifiers 108 and 134 are connected by diodes 136 and 138 to the input of the feedback integrator 66, whereby the lower voltage first initiates the action of the feedback integrator 66.

In operation, when the discharge current, $I_{DISCHG}$, creates a voltage across the charging current sensing resistor 46 that is greater than the analog voltage established by the value in the discharge current register 102, the output of the operational amplifier 108 begins to follow the voltage produced by the discharge current, $I_{DISCHG}$. In addition, when the discharge current, $I_{DISCHG}$, creates a voltage across the charging current sensing resistor 46 that is greater than the analog voltage established by the voltage divider 122, the output of the operational amplifier 134 begins to follow the voltage produced by the discharge current, $I_{DISCHG}$. The lower of the two voltages initiates integration by the feedback integrator 66.

Thus, the output voltage from diodes 136 and 138 is integrated by the feedback integrator 66, the output of which is applied to the noninverting input of a comparator 110. A ramp voltage 109 is applied to the inverting input of the comparator 110. Therefore, the output of the comparator 110 is a pulse-width-modulated (PWMed) voltage, the duty cycle of which is determined by the voltage level of the output of the feedback integrator 66. This, in turn, controls the driver logic circuit 72 which controls the on and off time of the boost MOSFET device 42 and 40 (see FIG. 2), which limits the amount of current drawn from the rechargeable battery pack 22, according to the digital value loaded into the discharge current register 102 or to a preset reference voltage.

When the embodiment of the rechargeable battery pack current regulation circuit 130 is instantiated in the amplifier, integrator, duty cycle, and driver circuits of FIG. 3A the same circuitry that is used to limit the charge current may also be utilized to perform the discharge current limiting function, through the use of dynamic switching (not shown) of the inverting and noninverting inputs and reversal of the output diodes 136 and 138. The circuit configuration showing operational amplifiers 106' and 108', and diodes 136' and 138' is shown in FIG. 3A as it would appear to support charge-current limiting. To support discharge-current limiting, the inverting and noninverting inputs of the operational amplifiers 106' and 108' are dynamically switched and the diodes 136' and 138' are reversed, for example, when the charger circuit 30 enters boost mode, to match the configurations shown in FIG. 6.

Electrical connections, couplings, and connections have been described with respect to various devices or elements. The connections and couplings may be direct or indirect. A connection between a first and second electrical device may be a direct electrical connection or may be an indirect electrical connection. An indirect electrical connection may include interposed elements that may process the signals from the first electrical device to the second electrical device.

Although the invention has been described and illustrated with a certain degree of particularity, it should be understood that the present disclosure has been made by way of example only, and that numerous changes in the combination and arrangement of parts may be resorted to without departing from the spirit and scope of the invention, as hereinafter claimed.

The invention claimed is:

1. A power supply system, comprising:
a single reconfigurable buck/boost system couplable to an adapter for receiving power therefrom and couplable to a rechargeable battery which is connectable to deliver a supply current to a load, the charger system limiting current drawn from the adapter and charging the battery in the buck mode; and
the single reconfigurable buck/boost system operating in a boost mode for operating the load at least in part from the battery and to regulate a discharge current from said rechargeable battery when said rechargeable battery is supplying power to said load,
wherein the reconfigurable buck/boost system comprises a first switch couplable to an output bus of the adapter in series with a second switch coupled to a reference voltage, a common node between the first and second switches being coupled to one terminal of the inductor, the other terminal of which is couplable to the battery, the reconfigurable buck/boost system operating the first and second switches in buck mode in which current flows into the battery in a first direction and operates the first and second switches in a boost mode in which current flows in a second direction from the battery to the output bus of the adapter.

2. The power supply system of claim 1 wherein said circuit to limit a discharge current comprises:
a digital register for containing a digital value representing a desired discharge current limit;
a d/a converter to convert said digital value to a reference voltage;
a circuit to sense a discharge current from said rechargeable battery to produce a discharge voltage representing said discharge current;
and an operational amplifier to amplify said reference voltage value with said discharge voltage to produce an output that follows said discharge voltage when said discharge voltage is larger than said reference voltage.

3. The power supply system of claim 2 wherein said digital value is established by a host computer.

4. The power supply system of claim 2 further comprising:
an integrator for integrating said output from said operational amplifier;
a pulse-width-modulation (PWM) circuit for producing a control signal having a PWM duty cycle representing said discharge voltage;
and a driver circuit for delivering said supply current to said load according to said control signal.

5. The power supply system of claim 1 wherein said circuit to limit a discharge current comprises:
a reference voltage source to produce a reference voltage;
a circuit to sense a discharge current from said rechargeable battery to produce a discharge voltage representing said discharge current;
and an operational amplifier to amplify said reference voltage with said discharge voltage to produce an output that follows said discharge voltage when said discharge voltage is larger than said reference voltage.

6. The power supply system of claim 5 wherein said reference voltage is established by a resistor voltage divider.

7. The power supply system of claim 5 wherein said reference voltage is set by a user.

8. The power supply system of claim 5 further comprising:
an integrator for integrating said output from said operational amplifier;
a pulse-width-modulation (PWM) circuit for producing a control signal having a PWM duty cycle representing said discharge voltage;
and a driver circuit for delivering said supply current to said load according to said control signal.

9. A power supply system, comprising:
a rechargeable battery connectable to deliver a supply current to a load;
a circuit to limit a discharge current from said rechargeable battery when said rechargeable battery is supplying power to said load, wherein said circuit to limit a discharge current comprises:
a circuit to sense a discharge current from said rechargeable battery to produce a discharge voltage representing said discharge current;
a digital register for containing a digital value representing a desired discharge current limit;
a d/a converter to convert said digital value to a first reference voltage;
a reference voltage source to produce a second reference voltage;
a first operational amplifier to amplify said first reference voltage with said discharge voltage to produce a first output that follows said discharge voltage when said discharge voltage is larger than said first reference voltage;

a second operational amplifier to amplify said second reference voltage with said discharge voltage produce a second output that follows said discharge voltage when said discharge voltage is larger than said second reference voltage; and a circuit to produce a combined voltage from said first and second outputs.

10. The power supply system of claim 9 wherein said digital value is established by a host computer.

11. The power supply system of claim 9 wherein said reference voltage source is adjusted by a user.

12. The power supply system of claim 9 further comprising:

an integrator for integrating said combined voltage;

a pulse-width-modulation (PWM) circuit for receiving said combined voltage and producing a control signal having a PWM duty cycle representing said discharge voltage;

and a driver circuit for delivering said supply current to said load according to said control signal.

13. A method for operating a power supply system, comprising:

receiving power from an adapter output bus in a single reconfigurable buck/boost system for charging a rechargeable battery in a buck mode wherein first and second series connected switches coupled between the adapter output bus and a reference voltage operated to control current flow in a first direction into the battery, the battery being connectable to deliver a supply current to a load;

limiting current drawn from the adapter by the buck/boost system;

operating the single reconfigurable buck/boost system in a boost mode wherein the first and second switches are operated to cause current to flow in a second direction from the battery to the adapter output bus to operate the load at least in part from the battery; and regulating a discharge current from said rechargeable battery when said rechargeable battery is supplying power to said load.

14. The method of claim 13 further comprising switching from a buck mode of operation to a boost mode of operation in which said rechargeable battery supplies additional supply current to said load.

15. The method of claim 13 further comprising:

when said discharge current exceeds a predetermined limit, generating a control signal having a duty cycle corresponding to an amount by which discharge current exceeds said predetermined limit;

and using said control signal to control the supply current to limit said discharge current.

16. The method of claim 13 wherein said providing a circuit to limit a discharge current from said rechargeable battery when said rechargeable battery is supplying power to said load comprises providing a digital register containing a digital value set by a host to represent a discharge current limit.

17. The method of claim 16 further comprising converting said digital value to an analog voltage representing said discharge current.

18. The method of claim 13 wherein said providing a circuit to limit a discharge current from said rechargeable battery when said rechargeable battery is supplying power to said load comprises providing a user settable reference voltage to represent a discharge current limit.

19. The method of claim 13 wherein said limiting a discharge current from said rechargeable battery when said rechargeable battery is supplying power to said load comprises providing a digital register containing a digital value set by a host to represent a first discharge current limit, providing a user settable reference voltage to represent a second discharge current limit, and using the lower of said first and second discharge current limits to limit said discharge current.

* * * * *